US005138838A

United States Patent [19]

Crosser

[11] Patent Number: 5,138,838

[45] Date of Patent: Aug. 18, 1992

[54] HYDRAULIC CIRCUIT AND CONTROL SYSTEM THEREFOR

[75] Inventor: Jeffrey A. Crosser, Joliet, Ill.

[73] Assignee: Caterpillar Inc., Peoria, Ill.

[21] Appl. No.: 655,703

[22] Filed: Feb. 15, 1991

[51] Int. Cl.[5] .................................... F16D 31/02

[52] U.S. Cl. .................................... 60/433; 60/426; 60/427; 60/445; 60/452; 60/461; 60/462; 91/421; 91/461; 91/463; 91/465; 91/529

[58] Field of Search ................. 91/461, 463, 465, 420, 91/421, 529; 60/393, 433, 426, 427, 445, 452, 461, 462

[56] References Cited

U.S. PATENT DOCUMENTS

| | | | |
|---|---|---|---|
| 3,464,443 | 9/1969 | Tennis | 137/596.12 |
| 4,161,905 | 7/1979 | Ota | 91/380 X |
| 4,329,911 | 5/1982 | Schwerin | 91/461 X |
| 4,340,087 | 7/1982 | El-Ibiary | 91/420 X |
| 4,528,813 | 7/1985 | Izumi et al. | 60/452 X |
| 4,702,148 | 10/1987 | Kussel et al. | 91/529 X |
| 4,718,329 | 1/1988 | Nakajima et al. | 91/461 X |
| 4,942,737 | 7/1990 | Tatsumi | 60/431 |
| 4,967,557 | 11/1990 | Izumi et al. | 60/452 X |
| 5,005,466 | 4/1991 | Miyoka | 91/420 |

FOREIGN PATENT DOCUMENTS

| | | | |
|---|---|---|---|
| 0094104 | 6/1982 | Japan | 91/461 |

*Primary Examiner*—Edward K. Look
*Assistant Examiner*—Todd Mattingly
*Attorney, Agent, or Firm*—John W. Grant

[57] ABSTRACT

Hydraulic control of reversible hydraulic motors typically requires several different valves to provide for the various operating parameters. The subject hydraulic control circuit has only a pair of electrohydraulic control valves to provide all the typical operating parameters. Operation of the control valves is controlled by a microprocessor in response to receiving command signals from a manually controlled command signal outputting device which establishes a desired fluid flow rate and direction of flow through the control valves.

20 Claims, 1 Drawing Sheet

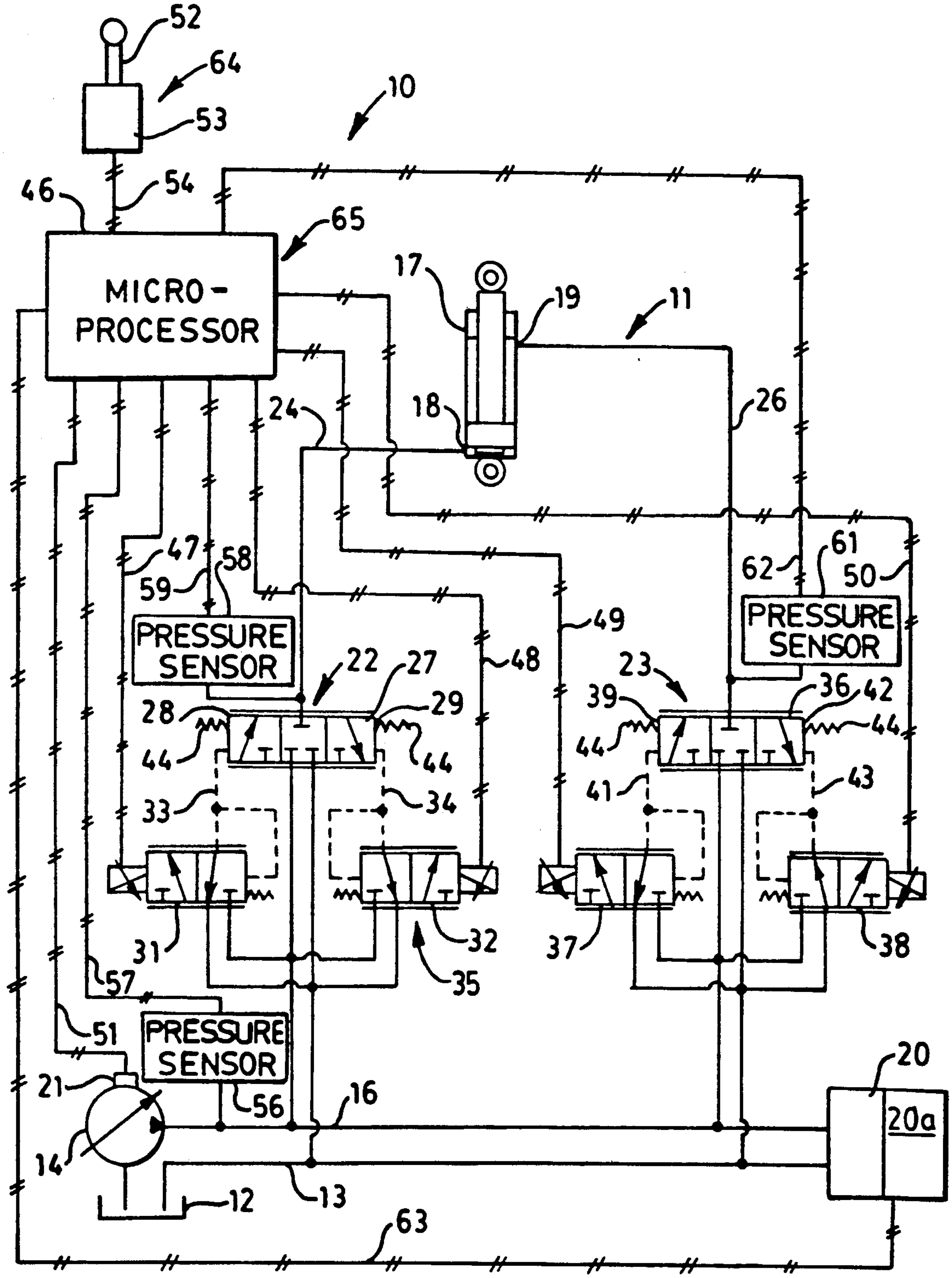
MICRO-PROCESSOR
PRESSURE SENSOR
PRESSURE SENSOR
PRESSURE SENSOR
10
11
12
13
14
16
17
18
19
20
20a
21
22
23
24
26
27
28
29
31
32
33
34
35
36
37
38
39
41
42
43
44
46
47
48
49
50
51
52
53
54
56
57
58
59
61
62
63
64
65

HYDRAULIC CIRCUIT AND CONTROL SYSTEM THEREFOR

DESCRIPTION

1. Technical Field

This invention relates generally to a hydraulic circuit and more particularly to a control system therefor having a pair of control valves arranged so that each control valve controls fluid flow to and from only one port of a reversible hydraulic motor.

2. Background Art

A hydraulic circuit for controlling a reversible hydraulic motor typically includes a three-position, four-way directional control valve having a single spool for controlling fluid flow from a pump to the motor and from the motor to a tank, a pair of line reliefs operatively associated with opposite sides of the reversible hydraulic motor, load check valves to block reverse flow of fluid if the load pressure is higher than the pump pressure at the time the directional control valve is shifted, and make-up valves for providing make-up fluid to a cavitated side of a motor in an overrunning condition. Additionally, if the circuit is integrally included in a load sensing or pressure compensated system, each circuit may also include a pressure compensating flow control valve for maintaining a predetermined pressure differential across the directional control valve and a resolver for directing the highest load pressure of the system to the pump controls.

One of the problems encountered with such circuit is that the use of all those valves to achieve the desired operating parameters of a single circuit generally adds to the cost of each circuit. Another problem encountered is that the directional control valve commonly has a single spool with the timing of the metering slots designed to optimize the control of the pump-to-motor fluid flow. Thus, the spool is generally inadequate for metering motor-to-tank fluid flow in an overrunning load condition. Another problem with such circuit is that a considerable amount of engineering development time is spent to provide proper operational metering characteristics for a given valve application. Current technology of valve development requires that the control valve be developed to meet subjective operator desired characteristics. The development is usually done with many trial and error iterations that coordinates the correct metering relationship of pump-to-motor and motor-to-tank fluid flows versus valve stem displacement.

In view of the above, it would be desirable to minimize the number of valves of a typical control circuit to thereby reduce the cost thereof while retaining all the operating parameters normally associated with such control circuits. It would also be desirable to be able to reduce the amount of engineering time to develop a control valve that meets subjective operator desired characteristics.

The present invention is directed to overcoming one or more of the problems as set forth above.

DISCLOSURE OF THE INVENTION

In one aspect of the present invention, a control system is provided for a control circuit having a tank, a pump connected to the tank, and a reversible hydraulic motor having a pair of motor ports. The control system comprises first and second electrohydraulic control valves with each being disposed between an associated one of the ports and the pump and the tank. Each of the control valves has a neutral position at which the associated port is blocked from the pump and the tank and is movable in a first direction in response to receiving a first control signal for establishing communication between the associated port and the pump and in a second direction in response to receiving a second control signal for establishing communication between the associated port and the tank. The extent of movement in either direction is dependent upon the magnitude of the control signal received thereby. A means is provided for outputting a command signal to establish a desired fluid flow rate and direction of fluid flow through both of the control valves. A control means is provided for processing the command signal, producing first and second discrete control signals in response to the command signal, and outputting the first control signal to one of the control valves and the second control signal to the other of the control valves.

BRIEF DESCRIPTION OF THE DRAWINGS

The sole figure is a schematic illustration of an embodiment of the present invention.

BEST MODE FOR CARRYING OUT THE INVENTION

A control system 10 is shown in association with a hydraulic circuit 11. The hydraulic circuit includes a tank 12, an exhaust conduit 13 connected to the tank 12, a hydraulic fluid pump 14 connected to the tank, a supply conduit 16 connected to the pump 14, and a reversible hydraulic motor 17 in the form of a double-acting hydraulic cylinder having a pair of motor ports 18,19. Another hydraulic circuit 20 having a control system 20*a* associated therewith is connected to the supply conduit 13 in parallel flow relationship to the circuit 11. The pump 14 is a variable displacement pump having an electrohydraulic displacement controller 21 which is operative to control the displacement of the pump in response to receiving an electrical control signal with the extent of displacement being dependent upon the magnitude of the control signal.

A pair of electrohydraulic proportional control valves 22,23 are individually connected to the the motor ports 18,19 through a pair of motor conduits 24,26 respectively. The control valves are also connected to the pump 14 and the tank 12. The control valve 22 includes a pilot operated valve member 27 having opposite ends 28,29 and being connected to the supply conduit 16, the exhaust conduit 13, and the motor conduit 24. The control valve 22 also includes a pair of electrohydraulic proportional valves 31,32, both of which are connected to the supply conduit 16 and the exhaust conduit 13. The proportional valve 31 is connected to the end 28 of the valve member 27 through a pilot line 33 while the proportional valve 32 is connected to the end 29 of the valve member 27 through a pilot line 34. The proportional valves 31,32 constitute a proportional valve means 35 for controlling the position of the valve member 27 in response to receiving electrical control signals. Alternatively, the proportional valves 31,32 can be integrated into a single three position proportional valve for selectively directing pressurized fluid to the opposite ends of the valve member 27.

The control valve 23 similarly has a pilot operated valve member 36 connected to the supply, exhaust, and motor conduits 16,13,26, and a pair of electrohydraulic proportional valves 37,38 connected to the supply conduit 16 and the exhaust conduit 13. The proportional valve 37 is connected to an end 39 of the valve member 36 through a pilot line 41 while the proportional valve 38 is connected to an end 42 of the valve member 36 through a pilot line 43. The valve members 27 and 36 are resiliently biased to the neutral position shown by centering springs 44.

Alternatively, each of the control valves 22,23 can be replaced with an electrohydraulic proportional valve wherein the valve member 27,36 is moved directly by an electric solenoid.

With the valve member 27 of the control valve 22 at the neutral position, the motor conduit 24 is blocked from the supply conduit 16 and the exhaust conduit 13. The valve member 27 is movable in a rightward direction for establishing communication between the supply conduit 16 and the motor conduit 24 and in a leftward direction for establishing communication between the motor conduit 24 and the exhaust conduit 13. The extent of movement of the valve member 27 in either direction is dependent upon the pilot pressure in the pilot lines 33 or 34. The proportional valves 31,32 are normally spring biased to the position shown at which the pilot lines 33 and 34 are in communication with the exhaust conduit 13. The proportional valve 31 is movable in a rightward direction to establish communication between the supply conduit 16 and the pilot line 33 in response to receiving an electrical control signal. Similarly, the proportional valve 32 is movable in a leftward direction for establishing communication between the supply conduit 16 and the pilot line 34 in response to receiving an electrical control signal. The fluid pressure established in the respective pilot lines 33,34 is dependent upon the magnitude of the control signal received by the respective proportional valve. Thus, the extent of the movement of the valve member 27 in either direction is dependent upon the magnitude of the control signal received by the proportional valves 31,32.

The control valve 23 is operational in essentially the same manner as the control valve 22.

The control system 10 also includes a microprocessor 46 connected to the proportional valves 31,32,37,38 through electrical lead lines 47,48,49,50, respectively. A control lever 52 is operatively connected to a position sensor 53 which in turn is connected to the microprocessor 46 through an electrical lead line 54. A fluid pressure sensor 56 is connected to the supply conduit 16 and to the microprocessor through a pressure signal line 57. Another pressure sensor 58 is connected to the motor conduit 24 and to the microprocessor through a pressure signal line 59. Still another pressure sensor 61 is connected to the motor conduit 26 and to the microprocessor 46 through a pressure signal line 62. The microprocessor is connected to the control system 20*a* through a lead line 63.

The control lever 52, the position sensor 53, and the lead line 54 provide a means 64 for outputting a command signal to establish a desired fluid flow rate and direction of fluid flow through both of the control valves 22,23.

The microprocessor 46 provides a control means 65 for processing the command signal, for producing first and second discrete control signals in response to the command signal, and for outputting the first control signal to one of the control valves 22,23, and the second control signal to the other of the control valves.

INDUSTRIAL APPLICABILITY

In operation, when the control lever 52 is in the centered position shown, no command signal is being transmitted through the signal line 54 to the microprocessor 46. When the microprocessor is not receiving a command signal, no control signals are being outputted through any of the control signal lines 47-51, such that the valve members 27 and 36 of the control valves 22 and 23 are in the neutral position to hydraulically lock the motor 17 in a fixed position. When no command signal is being received by the displacement controller 21, the displacement of the pump in this embodiment is reduced to a position to maintain a low standby pressure in the supply conduit 16.

To extend the hydraulic motor, the operator moves the control lever 52 rightwardly an amount corresponding to the speed at which he wants the motor to extend. In so doing, the position sensor 53 senses the operational position of the lever 52 and outputs a command signal to establish the direction of fluid flow and fluid flow rate through both control valves and 23 to achieve the desired motor speed. The command signal is transmitted through the lead line 54 to the microprocessor 46 which processes the command signal, produces first and second discrete valve control signals in response to the command signal and outputs the first signal through the lead line 47 to the proportional valve 31 and the second valve signal through the lead line 50 to the proportional valve 38. The microprocessor 46 simultaneously processes three discrete pressure signals received from the pressure sensors 56,58, and 61 to determine the magnitude of the first and second control signals dependent upon the forces acting on the hydraulic motor 17.

For example, assume that the force acting on the motor is one resisting extension thereof such that the pressure signal from the pressure sensor 58 is greater than the pressure signal from the pressure sensor 61. Under this condition, the microprocessor is operative to determine that the desired motor speed is to be achieved by controlling the fluid flow rate to the motor 17 through the control valve 22. Thus, the magnitude of the first control signal being outputted to the proportional valve 31 will correspond to the command signal. The proportional valve 31 is energized by the first control signal and moves rightwardly to direct pressurized fluid from the supply conduit 16 through the pilot line 33 to the end 28 of the valve member 27 causing it to move rightwardly to establish communication between the supply conduit 16 and the motor conduit 24. The proportional valve 38 is likewise energized by the second control signal and moves leftwardly to direct pressurized fluid from the supply conduit 16 through the pilot line 43 to the end 42 of the valve member 36 causing it to move leftwardly to establish communication between the motor conduit 23 and the exhaust conduit 13. The magnitude of the second control signal is selected by the microprocessor to result in the valve member 36 moving to a position providing substantially unrestricted fluid flow therethrough to the tank.

The microprocessor 46 is operative under the above operating conditions to delay the opening of the control valve 22 until the pressure in the supply conduit 16 exceeds the load or force generated fluid pressure in the motor conduit 24. More specifically, when the microprocessor receives the command signal, it compares the pressure signal from the sensor 58 with the pressure signal from the pressure sensor 56. When the pressure signal from the pressure sensor 58 is greater than that from the pressure sensor 56, the microprocessor 46 delays outputting of the first control signal until a pump control signal has been outputted to the displacement controller 21 to increase the pump displacement sufficient to cause the pressure in the supply conduit 16 to increase to a predetermined level greater than the pressure in the motor conduit 24. Once the desired pressure differential is reached, the first and second control signals are outputted to the proportional valves 31 and 38 of the control valves 22 and 23 respectively, to move the valve members 27 and 36 to the positions described above.

The fluid flow rate through the valve member 27 at a given operating position is determined by the pressure drop thereacross. In one mode of operation, the microprocessor 46 is operative to maintain a substantially constant pressure drop across the valve member 27 once the valve member is at an operating position by controlling the displacement of the pump 14. More specifically, the microprocessor continuously compares the pressure signals from the pressure sensors 56 and 58 and controls the magnitude of the pump control signal outputted to the displacement controller 21 so that the fluid pressure in the supply conduit 16 is higher than the fluid pressure in the motor conduit 22 by a predetermined pressure margin.

In another mode of operation, the microprocessor 46 is operative to determine the degree of opening of the valve member 27 in response to an operating pressure drop across the valve member 27 to achieve the desired flow rate. For example, assume that the hydraulic circuit 20 is also being operated simultaneously with the desired extension of the hydraulic motor 17 and that the fluid pressure required by the hydraulic circuit 20 is higher than that required to extend the hydraulic motor 17 by an amount greater than the predetermined pressure margin. Under that condition, the microprocessor 46 compares the pressure signals from the pressure sensors 56 and 58, determines the pressure drop occurring across the valve member and modifies the first valve control signal to the proportional valve 31 so that the degree of opening of the valve member 27 will be appropriate to achieve the desired flow rate at that operating pressure drop thereacross.

Assume now that the operator has moved the control lever 52 rightwardly to extend the hydraulic motor 17 but the force acting on the hydraulic motor is an overrunning load which assists the extension of the motor. In such condition, the pressure signal from the pressure sensor 61 will be greater than that of the pressure sensor 58. The microprocessor 46 in processing the pressure signals is operative to determine that under this condition, the desired motor speed is more appropriately achieved by controlling the fluid flow rate of the fluid being expelled from the hydraulic motor through the control valve 23. Accordingly, the magnitude of the second valve control signal outputted to the proportional valve 38 is precisely controlled to achieve the desired flow rate dictated by the position of the lever 52. The magnitude of the second control signal will vary depending upon the magnitude of the pressure signal from the pressure sensor 61 since the magnitude of that pressure signal correlates to the pressure drop across the valve member 36. The magnitude of the first control signal being directed to the proportional valve 31 from the microprocessor 46 will be sufficient to cause the control valve 27 to move to a position permitting substantially unrestricted fluid flow from the supply conduit 16 to the motor conduit 22 to fill the expanding side of the hydraulic motor 17.

To retract the hydraulic motor 17, the operator moves the control lever 52 leftwardly an amount corresponding to the speed at which he wants the hydraulic motor to retract. The control system 10 reacts similarly to that described above, but with the first control signal being outputted through the lead line 49 to the proportional valve 37 and the second control signal being outputted through the lead line 48 to the proportional valve 32. The microprocessor is operative to determine the magnitude of the first and second control signals as well as the control signal to the displacement controller 21 similarly to that described above dependent upon the forces acting on the hydraulic motor 17.

The microprocessor 46 is also operative to automatically relieve the fluid pressure in either motor conduit 24 or 26 should the pressure therein exceed a predetermined magnitude. For example, in some industrial operations, a load induced pressure may be generated in either of the motor conduits 24 or 26 due to an external load being applied to the hydraulic motor 17. The microprocessor continuously monitors the pressure signals from the sensors 58 and 61 and should the pressure signal generated from either one of those pressure sensors exceed a predetermined value, the microprocessor will automatically output a second control signal to the appropriate one of the proportional valves 32 or 38 to move the associated valve element 27 or 36 leftwardly for establishing communication between the appropriate motor conduit 24 or 26 with the exhaust conduit 13. Once the pressure is relieved, the microprocessor will stop the outputting of the second control signal and the effected valve member will move back to its locking position.

In view of the above, it is readily apparent that the structure of the present invention provides an improved control system for a hydraulic circuit in which a pair of electrohydraulic control valves controlled by a microprocessor provide the functions of a directional control valve, pressure compensated flow control valves, load check valves, line relief valves, and make-up valves. Moreover, the microprocessor can select which of the control valves are utilized to achieve a desired flow rate therethrough regardless of whether the hydraulic motor is subjected to positive or overrunning load conditions without any attention by the operator. Also, the control system will greatly reduce the amount of engineering development required to provide the subjective operator desired characteristics for a given hydraulic valve application. The control valves rely on one metering relationship versus travel whereby modulation changes can be made through changing the software of the microprocessor to meet the operator's subjective performance requirements.

Other aspects, objects, and advantages of this invention can be obtained from a study of the drawings, the disclosure, and the appended claims.

I claim:

1. A control system for a hydraulic circuit having a tank, a pump connected to the tank, a supply conduit connected to the pump, a reversible hydraulic motor, and a pair of motor conduits connected to the motor, comprising:

first and second independently operable electrohydraulic control valves with each being disposed between an associated one of the motor conduits and the supply conduit and the tank, each of the control valves having a neutral position at which the associated motor conduit is blocked from the supply conduit and the tank and being movable in a first direction in response to receiving a first control signal for establishing communication between the associated motor conduit and the supply conduit and in a second direction in response to receiving a second control signal for establishing communication between the associated motor conduit and the tank, the extent of movement in either direction being dependent upon the magnitude of the control signal received thereby;

pressure sensing means connected to the conduits for outputting a plurality of discrete pressure signals to the control means corresponding to the fluid pressures in the conduits;

means for outputting a command signal to establish a desired fluid flow rate and direction of fluid flow through both of the control valves; and control means for processing the command signal, for producing the first and second control signals in response to the command signal, and for outputting the first control signal to one of the control valves and the second control signal to the other of the control valves, said control means being operative for processing the pressure signals and modifying the first control signal to maintain the desired flow rate through the control valve receiving the first control signal regardless of the pressure differential thereacross.

2. A control system for a hydraulic circuit having a tank, a pump connected to the tank, a supply conduit connected to the pump, a reversible hydraulic motor, and a pair of motor conduits connected to the motor, comprising:

first and second independently operable electrohydraulic control valves with each being disposed between an associated one of the motor conduits and the supply conduit and the tank, each of the control valves having a neutral position at which the associated motor conduit is blocked from the supply conduit and the tank and being movable in a first direction in response to receiving a first control signal for establishing communication between the associated motor conduit and the supply conduit and in a second direction in response to receiving a second control signal for establishing communication between the associated motor conduit an the tank, the extent of movement in either direction being dependent upon the magnitude of the control signal received thereby;

means for outputting a command signal to establish a desired fluid flow rate and direction of fluid flow through both of the control valves; and control means for processing the command signal, for producing the first and second control signals in response to the command signal, and for outputting the first control signal to one of the control valves and the second control signal to the other of the control valves, pressure sensing means connected to the conduits for outputting a plurality of discrete pressure signals to the control means corresponding to the fluid pressures in the conduits, the pressure sensing means including first and second pressure sensors connected to the motor conduits to output at least two of the pressure signals to the control means, the control means being operative for processing the pressure signals and modifying the second control signal to achieve the desired flow rates through the control valves when the fluid pressure in the motor conduit connected to the control valve receiving the second control signal is the higher of the fluid pressures in the motor conduits.

3. A control system for a hydraulic circuit having a tank, a pump connected to the tank, a supply conduit connected to the pump, a reversible hydraulic motor, and a pair of motor conduits connected to the motor, comprising:

first and second independently operable electrohydraulic control valves with each being disposed between an associated one of the motor conduits and the supply conduit and the tank, each of the control valves having a neutral position at which the associated motor conduit is blocked from the supply conduit and the tank and being movable in a first direction in response to receiving a first control signal for establishing communication between the associated motor conduit and the supply conduit and in a second direction in response to receiving a second control signal for establishing communication between the associated motor conduit and the tank, the extent of movement in either direction being dependent upon the magnitude of the control signal received thereby;

means for outputting a command signal to establish a desired fluid flow rate and direction of fluid flow through both of the control valves;

control means for processing the command signal, for producing the first and second control signals in response to the command signal, and for outputting the first control signal to one of the control valves and the second control signal to the other of the control valves, and pressure sensing means connected to the conduits for outputting a plurality of discrete pressure signals to the control means corresponding to the fluid pressures in the conduits, the control means being operative to determine which of the fluid pressures in the motor conduits is higher and to select which of the control valves will be controlled to achieve the desired flow rate therethrough based on that determination.

4. A control system for a hydraulic circuit having a tank, a pump connected to the tank, a supply conduit connected to the pump, a reversible hydraulic motor, and a pair of motor conduits connected to the motor, comprising:

first and second independently operable electrohydraulic control valves with each being disposed between an associated one of the motor conduits and the supply conduit and the tank, each of the control valves having a neutral position at which the associated motor conduit is blocked from the supply conduit and the tank and being movable in a first direction in response to receiving a first control signal for establishing communication between the associated motor conduit and the supply conduit and in a second direction in response to receiving a second control signal for establishing communication between the associated motor conduit and the tank, the extent of movement in either direction being dependent upon the magnitude of the control signal received thereby;

means for outputting a command signal to establish a desired fluid flow rate and direction of fluid flow through both of the control valves;

control means for processing the command signal, for producing the first and second control signals in response to the command signal, and for outputting the first control signal to one of the control valves and the second control signal to the other of the control valves; and pressure sensing means connected to the conduits for outputting a plurality of discrete pressure signals to the control means corresponding to the fluid pressures in the conduits, and wherein said pump is a variable displacement pump having a displacement controller for controlling the displacement thereof in response to the magnitude of a pump control signal directed thereto, said control means being operative to process the pressure signals and to direct a pump control signal to the displacement controller at a magnitude sufficient to establish a predetermined pressure differential between the supply conduit and one of the motor conduits.

5. The control system of claim 1 wherein each of the control valves includes a pilot operated valve member having opposite ends, and electrohydraulic proportional valve means for controlling the position of the valve member in response to receiving the control signals.

6. The control system of claim 5 wherein the proportional valve means includes a pair of electrohydraulic proportional valves electrically connected to the control means to receive the first an second control signals and individually hydraulically connected to the opposite ends of the valve member, and including a source of pressurized fluid connected to the proportional valves.

7. The control system of claim 6 wherein each of the proportional valves has a first position at which the associated end of the valve member is communicated to the tank and is movable in a first direction for communicating the source of pressurized fluid with the associated end of the valve member, wherein the level of the pressurized fluid being directed to the associated end corresponds to the magnitude of the control signal directed to the proportional valve.

8. The control system of claim 7 wherein the source of pressurized fluid is the pump and the supply conduit.

9. The control system of claim 3 wherein each of the control valves includes a pilot operated valve member having opposite ends, and a pair of electrohydraulic proportional valves electrically connected to the control means to receive the first and second control signals and individually hydraulically connected to the opposite ends, each of the proportional valves being connected to the pump and the tank.

10. The control system of claim 9 wherein each of the proportional valves has a first position at which the associated end of the valve member is communicated to the tank and is movable in a first direction for communicating the pump with the associated end of the valve member, wherein the level of the pressurized fluid being directed to the associated end corresponds to the magnitude of the control signal directed to the proportional valve.

11. The control system of claim 1 wherein the command signal outputting means includes a manually controlled lever and a position sensor for sensing an operating position of the lever and outputting the command signal to the control means representative of the direction and the degree of movement of the lever.

12. A control system for a hydraulic circuit having a tank, a pump connected to the tank, a supply conduit connected to the pump, a reversible hydraulic motor, and a pair of motor conduits connected to the motor, comprising:

first and second independently operable electrohydraulic control valves with each being disposed between an associated one of the motor conduits and the supply conduit and the tank, each of the control valves having a neutral position at which the associated motor conduit is blocked from the supply conduit and the tank and being movable in a first direction in response to receiving a first control signal for establishing communication between the associated motor conduit and the supply conduit and in a second direction in response to receiving a second control signal for establishing communication between the associated motor conduit and the tank, the extent of movement in either direction being dependent upon the magnitude of the control signal received thereby;

means for outputting a command signal to establish a desired fluid flow rate and direction of fluid flow through both of the control valves; and control means for processing the command signal, for producing the first and second control signals in response to the command signal, and for outputting the first control signal to one of the control valves and the second control signal to the other of the control valves, wherein the command signal outputting means is operative to interrupt the outputting of the command signal and the control means is operative for determining when the fluid pressure in one of the motor conduits exceeds a predetermined level and for outputting the second signal to the control valve connected to the one motor conduit.

13. A control system for a hydraulic circuit having a tank, a pump connected to the tank, a supply conduit connected to the pump, a reversible hydraulic motor, and a pair of motor conduits connected to the motor, comprising:

first and second independently operable electrohydraulic control valves with each being disposed between an associated one of the motor conduits and the supply conduit and the tank, each of the control valves having a neutral position at which the associated motor conduit is blocked from the supply conduit and the tank and being movable in a first direction in response to receiving a first control signal for establishing communication between the associated motor conduit and the supply conduit and in a second direction in response to receiving a second control signal for establishing communication between the associated motor conduit and the tank, the extent of movement in either direction being dependent upon the magnitude of the control signal received thereby;

means for outputting a command signal to establish a desired fluid flow rate and direction of fluid flow through both of the control valves;

means for sensing the fluid pressure in the supply conduit and at least one of the motor conduits and outputting at least two discrete pressure signals; and control means for processing the command signal and the pressure signals, producing the first control signal with the magnitude thereof based on a combination of the command and pressure signals, and outputting the first control signal to one of the control valves to move the one control valve to a position providing the desired flow rate.

14. A control system for a hydraulic circuit having a tank, a variable displacement pump connected to the tank, a supply conduit connected to the pump, a reversible hydraulic motor, and a pair of motor conduits connected to the motor, comprising:

an electronic displacement controller connected to the pump to control the displacement of the pump in response to the magnitude of a pump control signal directed thereto;

first and second electrohydraulic control valves with each being disposed between an associated one of the motor conduits and the supply conduit and the tank, each of the control valves having a neutral position at which the associated motor conduit is blocked from the supply conduit and the tank and being movable in a first direction in response to receiving a first control signal for establishing communication between the associated motor conduit and the supply conduit and in a second direction in response to receiving a second control signal for establishing communication between the associated motor conduit and the tank, the extent of movement in either direction being dependent upon the magnitude of the control signal received thereby;

means for outputting a command signal to establish a desired fluid flow rate and direction of fluid flow through both of the control valves;

means for sensing the fluid pressure in the supply conduit and the motor conduits and outputting a plurality of discrete pressure signals; and control means for processing the command and pressure signals, determining whether the desired fluid flow rate is to be established by controlling the position of the control valves only or by moving one of the control valves to a position based on the magnitude of the command signal and controlling the pump displacement to establish a predetermined pressure drop across the one control valve, and outputting the appropriate signals to the control valves and the displacement controller.

15. The control system of claim 14 wherein the determination is based on the difference between the fluid pressure in the supply conduit and the higher of the fluid pressures in the motor conduits.

16. The control system of claim 14 wherein the control means is operative to determine which of the fluid pressures in the motor conduits is higher and to select which one of the control valves will be controlled to achieve the desired fluid flow rate therethrough based on that determination.

17. The control system of claim 16 wherein the control means is operative to output the first control signal to the selected one of the control valves, the second control signal to the other control valve, and a pump control signal to the displacement controller when the pressure in the supply conduit is a predetermined amount higher than the highest of the pressures in the motor conduits.

18. A control system for a hydraulic circuit having a tank, a variable displacement pump connected to the tank and having an electronic displacement controller, a supply conduit connected to the pump, a reversible hydraulic motor, and a pair of motor conduits connected to the motor, comprising:

first and second electrohydraulic control valves with each being disposed between an associated one of the motor conduits and the supply conduit and the tank, each of the control valves having a neutral position at which the associated motor conduit is blocked from the supply conduit and the tank and being movable in a first direction in response to receiving a first control signal for establishing communication between the associated motor conduit and the supply conduit and in a second direction in response to receiving a second control signal for establishing communication between the associated motor conduit and the tank, the extent of movement in either direction being dependent upon the magnitude of the control signal received thereby;

means for outputting a command signal to establish a desired fluid flow rate and direction of fluid flow through both of the control valves;

means for sensing the fluid pressure in the supply conduit and at least one of the motor conduits and outputting at least two discrete pressure signals; and control means for processing the command and the pressure signals, determining the relative fluid pressures in the supply conduit and the one motor conduit on the basis of the pressure signals, producing the first control signal with the magnitude thereof based solely on the command signal when the pressure in the one motor conduit is higher than the pressure in the supply conduit, and outputting the first control signal to one of the control valves so that the one control valve moves to a position providing the desired fluid flow rate.

19. The control system of claim 18 wherein the control means is operative to output a pump control signal to the displacement controller at a magnitude sufficient to establish a predetermined pressure differential between the supply conduit and the one motor conduit when the pressure in the one motor conduit is higher than the pressure in the supply conduit.

20. A control system for a hydraulic circuit having a tank, a variable displacement pump connected to the tank and having an electronic displacement controller, a supply conduit connected to the pump, a reversible hydraulic motor, and a pair of motor conduits connected to the motor, comprising:

first and second electrohydraulic control valves with each being disposed between an associated one of the motor conduits and the supply conduit and the tank, each of the control valves having a neutral position at which the associated motor conduit is blocked from the supply conduit and the tank and being movable in a first direction in response to receiving a first control signal for establishing communication between the associated motor conduit and the supply conduit and in a second direction in response to receiving a second control signal for establishing communication between the associated motor conduit and the tank, the extent of movement in either direction being dependent upon the magnitude of the control signal received thereby;

means for outputting a command signal to establish a desired fluid flow rate and direction of fluid flow through both of the control valves;

means for sensing the fluid pressure in the supply conduit and at least one of the motor conduits and outputting at least two discrete pressure signals; and control means for processing the command and the pressure signals, determining the relative pressures in the supply conduit and the one motor conduit on the basis of the pressure signals, producing the first control signal with the magnitude thereof based on a combination of the command and pressure signals when the pressure in the supply conduit is higher than the pressure in the one motor conduit by a predetermined amount, and outputting the first control signal to one of the control valves so that the one control valve moves to a position providing the desired fluid flow rate.

* * * * *